United States Patent [19]
Fisch et al.

[11] Patent Number: 4,873,520
[45] Date of Patent: Oct. 10, 1989

[54] PAGING RECEIVER FOR STORING DIGITIZED VOICE MESSAGES

[75] Inventors: Kenneth D. Fisch, Delray Beach; Alfred R. Lucas, Coral Springs; David F. Willard, Plantation, all of Fla.

[73] Assignee: Motorola, Inc., Schaumburg, Ill.

[21] Appl. No.: 115,029

[22] Filed: Nov. 2, 1987

[51] Int. Cl.⁴ .............................................. H04Q 7/00
[52] U.S. Cl. ........................... 340/825.44; 340/311.1; 379/56; 379/88
[58] Field of Search ....................... 340/825.44, 825.48, 340/311.1; 379/56, 57, 88; 455/38, 54; 370/93; 360/32; 381/36; 369/7

[56] References Cited
U.S. PATENT DOCUMENTS

| | | | |
|---|---|---|---|
| 4,272,810 | 6/1981 | Gates et al. | 379/88 |
| 4,356,519 | 10/1982 | Cogdell, Jr. | 340/825.44 |
| 4,412,217 | 10/1983 | Willard et al. | |
| 4,415,776 | 11/1983 | Tang et al. | 379/88 |
| 4,424,514 | 1/1984 | Fennell et al. | 340/825.44 |
| 4,468,813 | 8/1984 | Burke et al. | |
| 4,477,807 | 10/1984 | Nakajima et al. | |
| 4,479,124 | 10/1984 | Rodriguez et al. | |
| 4,495,647 | 1/1985 | Burke et al. | |
| 4,499,567 | 2/1985 | Armstrong | 340/825.44 |
| 4,590,473 | 5/1986 | Burke et al. | 340/825.44 |
| 4,677,657 | 6/1987 | Nagata et al. | |
| 4,692,742 | 9/1987 | Raizen et al. | |
| 4,701,943 | 10/1987 | Davis et al. | |
| 4,713,661 | 12/1987 | Boone et al. | |
| 4,769,642 | 9/1988 | Davis et al. | 340/825.44 |

FOREIGN PATENT DOCUMENTS
WO87/04309 7/1987 PCT Int'l Appl. .

*Primary Examiner*—Donald J. Yusko
*Assistant Examiner*—Edwin C. Holloway, III
*Attorney, Agent, or Firm*—William E. Zitelli; Vincent B. Ingrassia

[57] ABSTRACT

A selective call paging receiver for receiving analog voice information converts the analog information to digital information and stores the digital information in a memory of the paging receiver. In a first embodiment, the paging receiver includes a hardware controlled decoder and an audio producing module. The memory is divided into a plurality of fixed storage areas to allow the decoder to store a digitized voice message in a fixed storage area. If the storage capacity of the fixed storage area is not filled, the audio producing module fills the remainder in a predetermined bit pattern. In a second embodiment, the paging receiver includes a microprocessor controlled decoder. The microprocessor stores a digitized voice message in the memory, depending upon the length of the voice message, thus eliminating the fixed storage area.

7 Claims, 8 Drawing Sheets

PAGING RECEIVER FOR STORING DIGITIZED VOICE MESSAGES

BACKGROUND OF THE INVENTION

Field of the Invention

This invention relates to paging systems and more particularly to a paging receiver for receiving information having analog voice messages, digitizing the analog voice messages, and storing the voice messages in a memory for playback.

Communication systems in general and paging systems in particular using transmitting call signals have attained widespread use for calling selected receivers to transmit information from a base station transmitter to the receivers. Modern paging systems and paging receivers in particular have achieved multifunction capabilities through the use of microcomputers which allow the paging receiver to respond to information having various combinations of tone, tone and voice, or data messages. This information has been transmitted using a number of well known paging coding schemes and message formats.

In the operation of such paging receivers, important factors involved in their operation have been the portability of the receiver, the size of the paging receiver, the cost of manufacturing the paging receiver, the limited energy available for the paging receiver, the limited availability of the radio spectrum, the fast response time required in today's active society, and the number of paging receivers included in the paging system. In such paging receivers, in order that the drain on the battery may be minimized, the paging receiver has been systematically turned off and turned on to maximize the length of time energy is available from the battery (battery saving). The limited energy in which the paging receiver must operate constrains the type of electronic circuitry available for such paging receivers.

Prior voice type paging systems have used analog voice channels for the transmission and reception of voice messages. While certain types of paging systems have used binary signalling formats, transmission in an analog form has remained the most common technique for voice signalling. Prior analog paging receivers that have used analog representation to store voice signals have been limited in several features. These include the ability to store voice messages in a reasonable size memory to recall at a later time, use of digital modulation techniques to store and reconstruct voice messages, and the ability to increase throughput in a paging RF channel receiver. Digital processing of voice messages is, in general, qualitatively superior to analog processing. This has been a result of the fact that once voice messages are in a digitally represented form, they are not subject to the type of signal degradation that usually occurs in analog processing. Thus, it is beneficial to represent the voice message in digital form rather than analog form being subject to the type of distortion inherent in analog processing techniques.

Another problem with prior analog voice paging receivers has been in the ability to store a plurality of voice messages and selectively recall a particular voice message. One prior analog voice paging receiver attempted to overcome this problem by storing the voice information on conventional analog magnetic tape (U.S. Pat. No. 4,356,519). While such a voice type paging receiver has been available, it has been commercially unfeasible. Some of the reasons has been the high cost of the electronic components, the low battery life from the high drain of current required by the tape mechanism, and the difficulty in operating the pager in a battery saving environment. Additionally, if a sequence of messages have been stored on a tape, the ability to recall a single message has been hampered by the inability of the analog magnetic tape to randomly select the selected message. Thus, prior analog voice paging systems were developed without the ability of the paging receiver to store voice messages.

Figure 1:
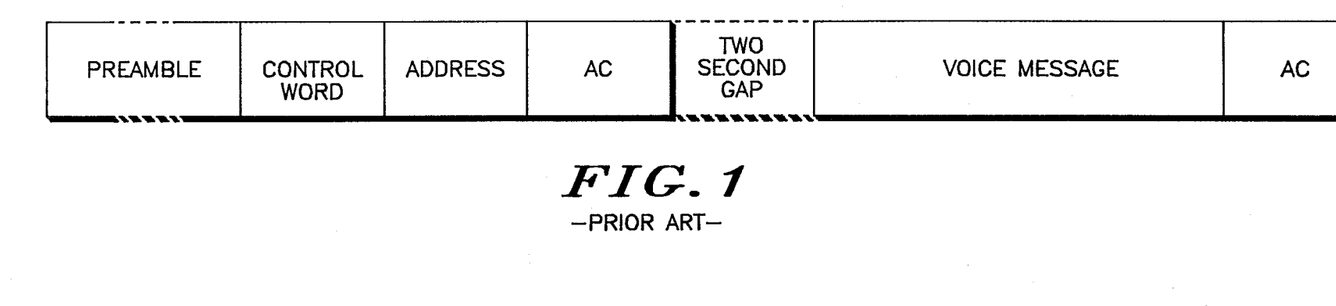
FIG. 1 is an example of a prior art paging format for transmitting voice messages.

A further problem with analog voice paging systems has been the transmission of a two-second alert gap before each voice message as illustrated in the paging format of FIG. 1. The alert time gap has been a necessity since prior analog voice paging receivers could not store messages and needed to generate an alert before the voice message to notify the paging receiver user of an incoming voice message. In the prior analog voice paging receivers, when the alert on the analog voice paging receiver sounded, the user had to be present to receive the message. As is evident, with a paging receiver capable of storing voice messages, the user does not have to be present to receive the message. Eliminating the gap would be extremely beneficial because message transmission throughput on the RF channel would increase.

Turning now to a disadvantage that has arisen with respect to digital stored voice paging receivers having fixed length allocated storage areas to store the voice message. Applicants have discovered a problem resulting from the recording of channel noise in the storage area after the reception of a voice message. This condition occurs when the length (transmission time) of the voice message is less than the storage capacity of the storage area. In this case, when the voice message is less than the capacity of the storage area, channel noise has been stored in the storage area until the storage area has been filled. This channel noise may take the form of white noise or the next message transmitted on the RF channel. During playback, this has resulted in the user hearing the voice message followed immediately by undesirable channel noise or the remainder of a previously stored message if the storage of the current message is aborted by the receipt of a new page (i.e. back-to-back pages). As is evident, it would be very desirable to eliminate this annoying problem.

SUMMARY OF THE INVENTION

It is therefore an object of the present invention to overcome the problems of the prior art analog voice paging systems by providing a more useful and efficient digitized stored voice paging receiver.

It is another object of the present invention to increase the throughput in a voice paging system by eliminating the two-second gap time.

It is another object of the present invention to eliminate unnecessary channel noise in a digital stored voice paging receiver having an allocated fixed storage area.

It is yet another object of the present invention to provide a digital stored voice paging receiver having variable storage areas for voice messages to eliminate the recording of unnecessary channel noise.

These as well as other objects and advantageous features of the present invention will be apparent and in part pointed out hereinafter.

In general, a communication receiver, such as a paging receiver, for receiving analog information having at least one voice message, includes a receiving means, a decoding means, a memory means, and a conversion means. The receiving and decoding means receives information signals including selective call signals having control signals and at least one voice message, decodes the information signals for selectively enabling the receiver correlating to the received control information, and decodes the information to recover the voice message. The conversion means converts the analog voice information to digital information, the digital information being representative of a replica of the analog voice message. The digital information is then stored in a memory of the selected receiver.

In a first embodiment of the present invention, the paging receiver includes a hardware controlled decoder and an audio producer module. The memory includes a plurality of allocated fixed storage areas to permit the decoder to store a voice message in a storage area. When the length of a digitized voice message does not fill the storage capacity of the storage area, the audio producer module fills the remaining capacity of the storage area with a predetermined digital signal such as a music melody, a plurality of frequencies or tones, or silence.

In a second embodiment of the present invention, the digital stored voice pager includes a microcomputer controlled decoder. Software included in the microcomputer permits the digital voice pager to store a digitized voice message in variable length storage area of the memory. The length of the storage area depends upon the bit rate of the conversion means and the length of the voice message.

Finally, a signalling system is presented which eliminates the alert time gap previously required, thus, increasing the throughput of the paging RF channel and allowing more voice messages to be transmitted per unit time.

CROSS-REFERENCE TO RELATED PATENT APPLICATIONS

The present patent application is one of a group of copending patent applications which concern the same overall paging receiver configuration but which individually claim different inventive concepts embodied in such overall paging receiver configuration. These related patent applications were filed on the same date, namely, June 30, 1987, are specifically incorporated by reference herein, and are more particularly described as follows:

(1) Application Ser. No. 07/68,073 entitled "Digitized Stored Voice Paging Receiver Having a Single Input User Control", the inventors being Fisch et al., assigned to the assignee of the present application;

(2) Application Ser. No. 07/68,683 entitled "Prioritization of Stored Messages in a Digital Voice Paging Receiver", the inventors being Fisch et al., assigned to the assignee of the present application; and (3) Application Ser. No. 07/68,682 entitled "Digitized Stored Voice Paging Receiver", the inventors being Bennett et al., assigned to the assignee of the present application.

BRIEF DESCRIPTION OF THE DRAWINGS

For the purpose of illustrating the invention, there is shown in the drawings an embodiment which is presently preferred, it being understood, however, that the invention is not limited to the precise arrangement and instrumentality shown.

DETAILED DESCRIPTION OF THE PREFERRED EMBODIMENT

In order to best illustrate the utility of the present invention, it is described in conjunction with a communication receiver, such as a paging receiver, capable of receiving, decoding, and storing transmitted analog information such as voice messages. While the present invention is described hereinafter with particular reference to a paging receiver, it is to be understood at the outset of the description which follows it is contemplated that the apparatus and methods, in accordance with the present invention, may be used with numerous other communication receiving systems.

The digitized voice paging receiver system described herein is associated with a paging system having a base station terminal, responds to coded data information from the base station terminal, and in turn, decodes, digitizes, stores, and provides analog information in the form of voice messages to a user during operation. With reference to the drawings in general, there is illustrated a paging receiver 10 and a method for receiving, decoding, digitizing, and storing voice messages transmitted from the base station terminal. The method and apparatus in one form of the present invention includes a hardware controlled decoder for decoding, digitizing, and storing messages in a plurality of allocated fixed length storage memory areas. Another form of the invention includes a software controlled microcomputer decoder for decoding, digitizing, and storing messages in a plurality of variable length storage areas.

Figure 2:
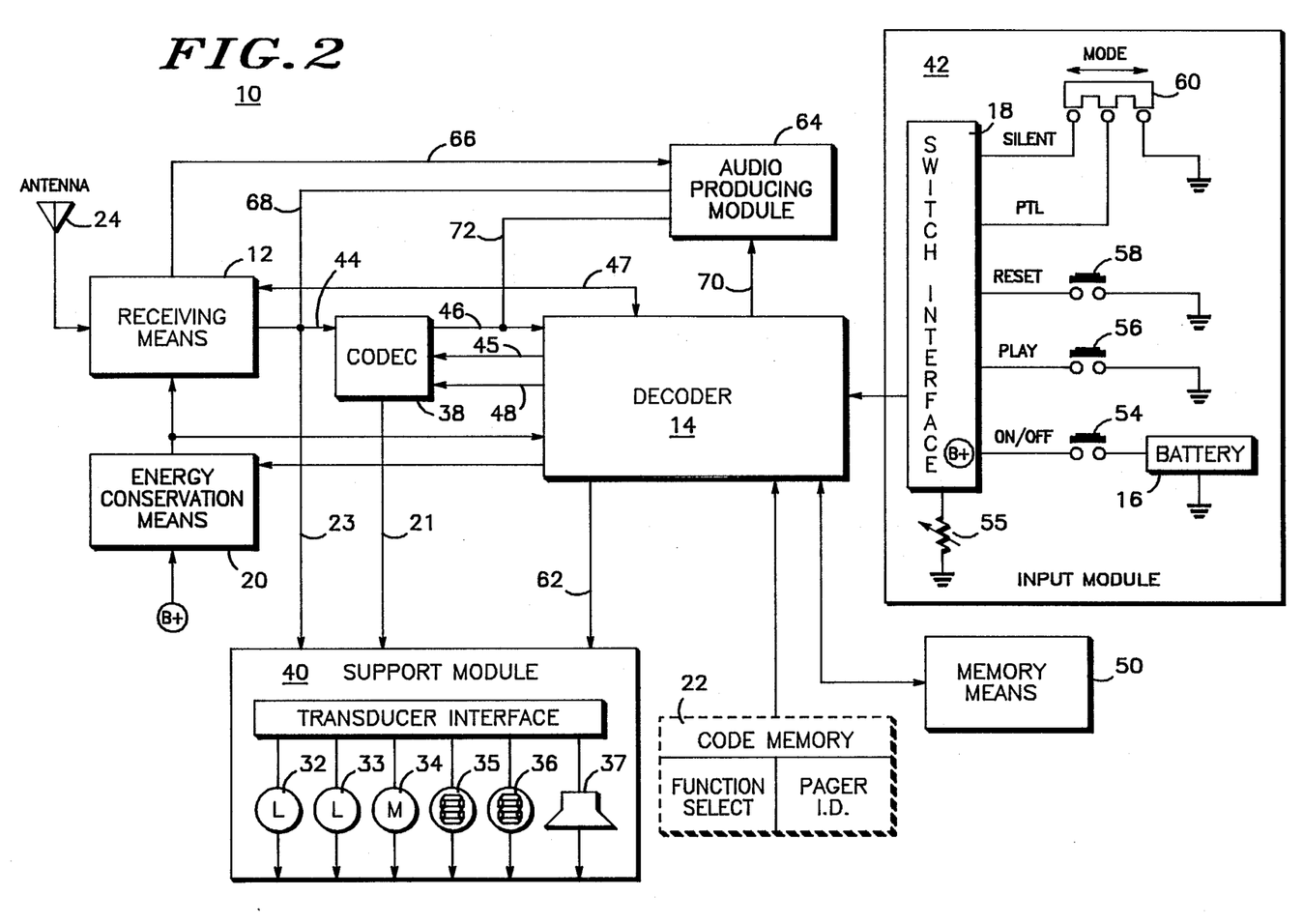
FIG. 2 is an overall schematic diagram for a hardware embodiment of a digitized stored voice paging receiver.

FIG. 2 shows a functional block diagram applicable to a first embodiment of the present invention. The paging receiver 10 of the present invention includes a receiving means 12, a decoding-controlling means (decoder) 14, a memory means 50, a support module 40, an input switch module 42, an energy conservation means 20, a converting means 38, and an audio producer module 64. An antenna 24 receives paging information in the form of selective call signals having control signals and analog information comprised of speech signals representative of a voice message. The antenna 24 is coupled to receiving means 12 that is subject to the control of decoder 14. The decoder 14 not only controls receiving means 12, but may also operate receiving means 12 on an intermittent basis to extend the life of battery 16 through energy conservation means 20. The receiving means 12 detects the presence of electromagnetic energy representing the paging information and applies the information to the converting means such as coder-decoder 38. Operating under control from decoder 14 (line 45), the coder-decoder 38 converts the received analog signals, such as real time audio speech signals, to a stream of binary bits and reconverts stored binary bits to a replica of the original received analog signals, such as synthesized audio speech signals.

In the illustrated embodiment, the coder-decoder 38 (hereinafter referred to as CODEC) provides for the digital-to-analog and analog-to-digital conversion of speech signals. The CODEC 38, such as an adaptive delta modulator, converts or encodes an audio input signal (line 44) to a digital data stream (line 46) for storage and reconverts or decodes a digital data stream (line 48) to reconstruct an audio signal (line 21). In particular, the CODEC 38 monitors the real time audio signal on line 44 and compares it to a past value that it has reconstructed and generates a digital bit (sign) that indicates whether the reconstructed signal's voltage level is higher or lower than the present input value. The CODEC 38 then tries to adapt the reconstructed signal voltage to mirror the present value at the audio input by varying or modulating a current. The current charges or discharges a capacitor (not shown) which changes the reconstructed signal's voltage. The digital output on line 46 is the sign bit which indicates whether the reconstructed signal is behind the input or lower in voltage (logic "0") or ahead of the input or higher in voltage (logic "1"). Under control of decoder 14, the CODEC's digital output is stored in memory 50 and retrieved on line 48 to reconstruct a synthesized audio signal on line 21, thus closely replicating the real time audio signal in both amplitude and frequency. One example of such a coder-decoder is disclosed by N. S. Jayant in the publication "Adaptive Delta Modulation with a One-Bit Memory", Bell System Technical Journal, Vol. 49, No. 2, March 1970. The CODEC 38 is designed to operate at different sampling rates (bit or clock rates) including, but not limited to, 16 KHz, 25 KHz, and 33 KHz. The obvious implication of these rates is that for slower clock rates, longer messages can be stored in a fixed amount of memory at the expense of a lower signal to noise (S/N) ratio. For example, with a 100 mV P-P 1 KHz reference signal at the input, the signal to noise degradation is 11 dB at 33 KHz, 14 dB at 25 KHz, and 23 dB at 16 KHz.

Table 1 illustrates the number of messages that can be stored in the paging receiver using particular configurations of memory when the CODEC is operating at a specific bit rate. Even though the table lists specific memories, it is to be understood that numerous other memories can be used in the practice of the present invention. Continuing with the above described table, referring to the 1 megabit CMOS DRAM, if the paging receiver is configured for two messages and the CODEC is operating at 25 kilobits per second (KBPS), Table 1 illustrates that 20 seconds of voice information can be stored in one message slot. As is evident from Table 1, the CODEC operates in a plurality of operating rates such as 16 KBPS per second, 25 KBPS per second, and 32 KBPS per second. The operating rates can be selected by jumper connections within the paging receiver or by switches external to the paging receiver.

TABLE 1

Message Length as a Function of Bit Rate and Memory Size

| Number of Messages | 16 KBPS | 25 KBPS | 32 KBPS |
|---|---|---|---|
| One 256K CMOS DRAM | | | |
| 1 | 16 second | 10 second | 8 second |
| 2 | 8 second | 5 second | 4 second |
| Two 256K CMOS DRAMs | | | |
| 1 | 32 second | 20 second | 16 second |
| 2 | 16 second | 10 second | 8 second |
| 4 | 8 second | 5 second | 4 second |
| One 1 Meg CMOS DRAM | | | |
| 1 | 64 second | 40 second | 32 second |
| 2 | 32 second | 20 second | 16 second |
| 4 | 16 second | 10 second | 8 second |

As can be appreciated, various allocated fixed storage areas can be selected by the pager user. For example, using the 1 meg. CMOS DRAM, 4 messages can be stored in memory, each message having a fixed length of 16 seconds at 16 KBPS.

Continuing with reference to FIG. 2, to conserve power, most of the CODEC 38 is turned off when there are no read/write operations to the memory. The output buffers and control logic are always on since it may be necessary to monitor the channel or provide an alert tone when there are no messages stored. Keeping the buffers and control logic on also eliminates the need for additional current source controls to handle the switching of an additional current source.

The receiving means 12 is further coupled by line 23 to a support module 40. Operating in response to decoder 14, the real time audio signal on line 23 is applied to support module 40 which supplies analog or digital signals to one of annunciation transducers 32-37. In particular, decoder 14 controls support module 40 to apply either the real time audio signal on line 23 or the synthesized audio signal on line 21 to speaker 37.

Decoder 14 is coupled to memory means 50 which serves to include information for decoding the received information and for storing information received from CODEC 38. The CODEC 38 provides the analog-to-digital conversion of speech signals on line 46 which are stored in memory 50 as digital voice messages. In this embodiment, each digital voice message is stored in an allocated fixed length (storage capacity) storage area, depending upon the conversion rate of the CODEC 38 (see Table 1). A plurality of digital voice messages can be stored in memory 50 along with the status of each voice message. For example, a voice message may have either a read or unread status. The decoder 14 also functions to alert the paging user, store, recall, and playback voice messages.

The paging receiving of FIG. 2 has the capability of storing selective call voice messages for providing them to support module 40 according to the state of a plurality of inputs, such as the state of the control switches of input module 42. A switch interface 18 provides input capability for control switches 54-60. Illustratively, control switch 54 is an on/off switch for controlling power from battery 16. Control input 55 is a volume control for speaker 36. Control switch 56 is a play switch for playing back voice messages previously digitized and stored in memory 50. Control switch 58 is a reset switch to reset the paging receiver system and monitor the real time audio signal. Control switch 60 is a mode switch for operating the decoder in one of three modes. These modes are the silent, push to listen (PTL), and normal modes, the operation of which is not necessary for the understanding of the present invention but is explained in detail with reference to Application Ser. No. 07/68,682.

Considering FIG. 2 in somewhat further detail, the battery 16 is shown connected to decoder 14 through a switch interface 18. Battery 16 provides power to decoder 14 through an energy conservation means 20, such as a DC to DC converter. Decoder 14 is additionally connected to a code memory 22 further including regions designated function select and pager ID. The enclosure of code memory 22 with a broken line indicates a possibility that such a device can be made removable and therefore separable from the rest of the system. Another output 62 of decoder 14 is coupled to support module 40 to provide the necessary controls for generating alerts on one of alert transducers 32–37. The alert transducers may take the form of an illumination means 32 and 33, such as an LED, a vibration motor 34, a plurality of visible display counters 35 and 36, and an audio speaker 37. Output 62 also controls whether real time audio signals on line 23 from receiving means 12 or synthesized audio signals on line 21 from CODEC 38 are applied to audio speaker 37.

Communication between receiving means 12 and decoder 14 is achieved via line 47. Decoder control signals for the decoder 14 are received by receiving means 12 and passed to decoder 14 through line 47. Thus, decoder 14 can respond to decoder control signals present in the information sent from the base station.

An audio producer module 64 is responsive to receiving means 12 and decoder 14. An activation signal generated by receiving means 12 is fed to the audio producer module 64 via line 66. The activation signal such as a carrier squelch signal activates the audio producer module to generate a predetermined analog signal on line 68, which is coupled to the input of the CODEC 38 and line 23. The audio producer module 64 generates the predetermined analog signal upon sensing the activation signal from receiving means 12. The predetermined analog signal is terminated in response to a reset signal generated by decoder 14 and applied as input to the audio producer module 64 as shown by line 70. The reset signal is generated when the remaining capacity of the storage area is filled. For example, in the case where the activation signal is the carrier squelch signal, the predetermined analog signal is generated upon the termination of the analog voice message. If the analog voice message terminates before filling the capacity of the allocated storage area, instead of storing channel noise in the storage area, an aesthetically pleasing signal is produced by the audio producer module 64 and stored in the remaining capacity of the storage area. This aesthetically pleasing signal may take the form of a plurality of tones varying in frequency and time such as a music melody, a single tone, or just silence. This prevents unwanted information or noise from being stored for the remaining capacity of the allocated storage area.

Referring briefly to the activation signal from the receiving means 12, various forms of squelch (coded or carrier) are used to enable communication receivers. Two such techniques of squelch coding are described in Motorola Technical Training Manual No. TT-500 entitled "Portable Products—Digital Private Line Coded Squelch", the contents of which is hereby incorporated by reference. In these squelch techniques, a tone or a digital code word is continuously transmitted along with voice information in order to enable the receiving receiver audio circuitry. In the simpler of the two, receipt and termination of information is carried out using carrier squelch which is well known to one of ordinary skill in the art.

Continuing the discussion of storing a predetermined signal in memory, the audio producer module provides a predetermined analog signal to the input of CODEC 38 while simultaneously providing the predetermined analog signal to the input of support module 40. The CODEC 38 converts the analog signal from audio producer module 864 to a digital representation which is provided to decoder 14 for storage in the allocated storage area. Simultaneously, the predetermined analog signal is also provided to support module 40 to provide real time output to speaker 37. Thus, for a voice message being shorter than the storage area capacity, the user will hear the voice message followed by the predetermined audio analog signal until the storage area capacity is filled.

Figure 3:
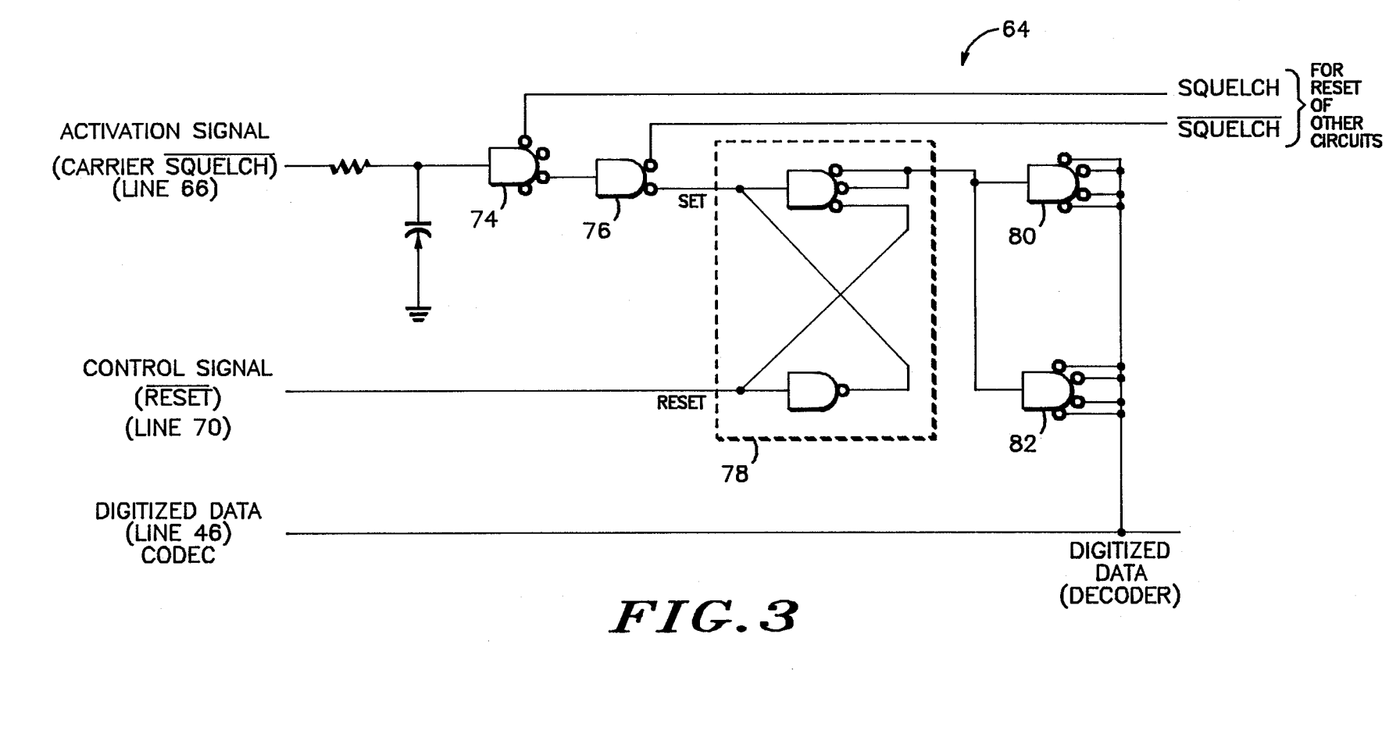
FIG. 3 is a circuit diagram illustrating one method for eliminating unnecessary channel noise in a digitized voice paging receiver having allocated fixed length storage areas.

In a preferred embodiment of the audio producer module 64, instead of the output of the audio producer module 64 being applied to the input of the CODEC 38, the audio producer module 64 output is applied directly to the output of the CODEC 38. Essentially, the output of the audio producer module 64 is then stored in the storage area, thus activating the audio producer module and bringing the audio producer module output to a logic level representative of a digital zero, clears the remaining storage area capacity. Reference is made to FIG. 3 for discussion of an electronic circuit capable of performing this function.

It is important to also note that decoder 14 may also include a predetermined digital representation of the analog signal which can be stored in memory 50. Instead of the audio producer module 64 providing the analog signal to the CODEC, the decoder 14 provides the predetermined digital pattern, such as an idle or quiet pattern, to the allocated storage area upon sensing a control signal from the receiving means 12 via line 47. Thus, the audio producer module 64 can be eliminated, however, at the expense of the real time audio producer module output.

The operation of the paging receiver shown in FIG. 2 is such that the receiving means 12 is capable of receiving messages in any of several message formats through an antenna 24. The decoder 14 responds to the received signals to analyze the data and select one of several decoding schemes for appropriately decoding the incoming information received by receiving means 12. As is well known with paging devices, the resulting decoded signal is tested for comparison with a designated pager address contained in code memory 22. On detecting correspondence between the received and decoded signal and the address in code memory 22, the decoder 14 instructs the CODEC 38 to digitize the real time analog signal and provide the digitized signal to the decoder 14 for storage in one of a plurality of message locations or storage areas in memory 50. An alert output signal may be produced by the decoder 14 to generate an alert indicating to the pager user that a message has been received and stored. In particular, the alert output signal from the decoder 14 is supplied to support module 40 to produce a signal on one of a plurality of transducers 32–37 indicative of the receipt of the message. Specifically, upon the receipt of a message, an unread message indicator 32 is activated, an unread message counter 35 and message counter 36 are incremented. Additionally, if all message slots are full, a memory full indicator 33 is activated.

If the user responds to the message alert, the user has the ability to hear the message in real time, depending upon the position of mode switch 60. Specifically, if the mode switch is on the normal mode, upon receipt of a voice message, the user hears an alert followed by the voice message. Simultaneously, the message is stored into an allocated storage area, depending upon the bit rate of the CODEC 38. When the voice message terminates, the activation signal on line 66 from the receiving means 12 is generated. In response to the activation signal, the audio producer module 64 generates a predetermined audio signal on line 68 which is applied to the CODEC 38 and the support module 40. The predetermined audio signal is played to the user and simultaneously converted by CODEC 38 to a digital data and stored in memory by decoder 14. The decoder 14 generates a reset signal when the capacity of the allocated storage area is reached to deactivate the audio producer module 64. Thus, the user hears the alert signal followed by the voice message and the audio producer module predetermined analog signal from the audio producer module, such as a music melody. The audio from the analog signal terminates when the digitized predetermined audio signal fills the remaining capacity of the allocated storage area.

Continuing the discussion of the operation of the paging receiver of FIG. 2, because of the requirements for high speed, real time signal processing and the requirement of preserving extended useful life of the battery contained in paging device, energy conservation means 20 functions in cooperation with decoder 14 to conserve battery 16. It may also be appreciated that the decoder 14 may be designated to operate in one of a plurality of possible decoding schemes. This selective function may be supplied by the code memory 22 or may be factory preset independently of the code memory 22. It may also be appreciated that code memory 22 may contain several addresses, each one corresponding to the appropriately selected decoding scheme which is determined by the decoder 14 in response to signals received by receiver 12.

In addition, code memory 22 includes a function select region which is used to select various features of the pager device. It is advantageous to build in the circuitry for all functions and then provide information in code memory 22 which identifies the address of the pager and designates various combinations of the possible function annunciation features of the system.

Referring now to FIG. 3, there is shown a detailed electrical diagram for a preferred embodiment of the audio producer module 64. The preferred embodiment uses carrier squelch as an activation signal. The particular circuit illustrated latches the digitized data line 46 at a logic zero level when activated by the carrier squelch (activation signal) from the receiving means. In the particular embodiment shown, the logic uses a negative level as an activation signal. The first series of NAND gates 74 and 76 are used to provide the correct logic for the reset of other circuits and to generate a positive squelch signal from NAND gate 74. An output of NAND gate 76 is fed to the set input of a latch 78 designated by a phantom line. The latch 78 is comprised of two NAND gates in a manner well known to those of ordinary skill in the art. The reset input to latch 78 is fed by the reset signal from the decoder. The output from latch 78 is level shifted by NAND gates 80 and 82 to the appropriate level to provide additional pull down capacity on digital data line. It is important to note that in the illustrated embodiment, the output of latch 78 controls the output of the CODEC 38.

In operation, upon enabling the activation signal, latch 78 is set which latches the digitized data line 46 to the decoder which is eventually fed to the memory at a logic zero level. Thus, zeroes are stored in the remaining allocated storage area until a control signal such as the reset signal is sent by the decoder. The reset signal is generated by the decoder upon the capacity of the allocated storage area being filled. Although the pull down network illustrated forces data into the memory to be a logical zero, a quieting or idle pattern can be stored on command with additional timing and control circuitry in a manner well known in the art. The pull down latch scheme illustrated typifies a typical circuit which uses the least number of circuit elements which is beneficial in manufacturing semiconductor chips to accomplish the above. Although the particular illustrated embodiment is used as a matter of illustrating the least number of circuit elements to accomplish the abovementioned function, it is understood that with the addition of further circuit elements, that more complicated digital bit patterns can be stored in memory.

Figure 4:
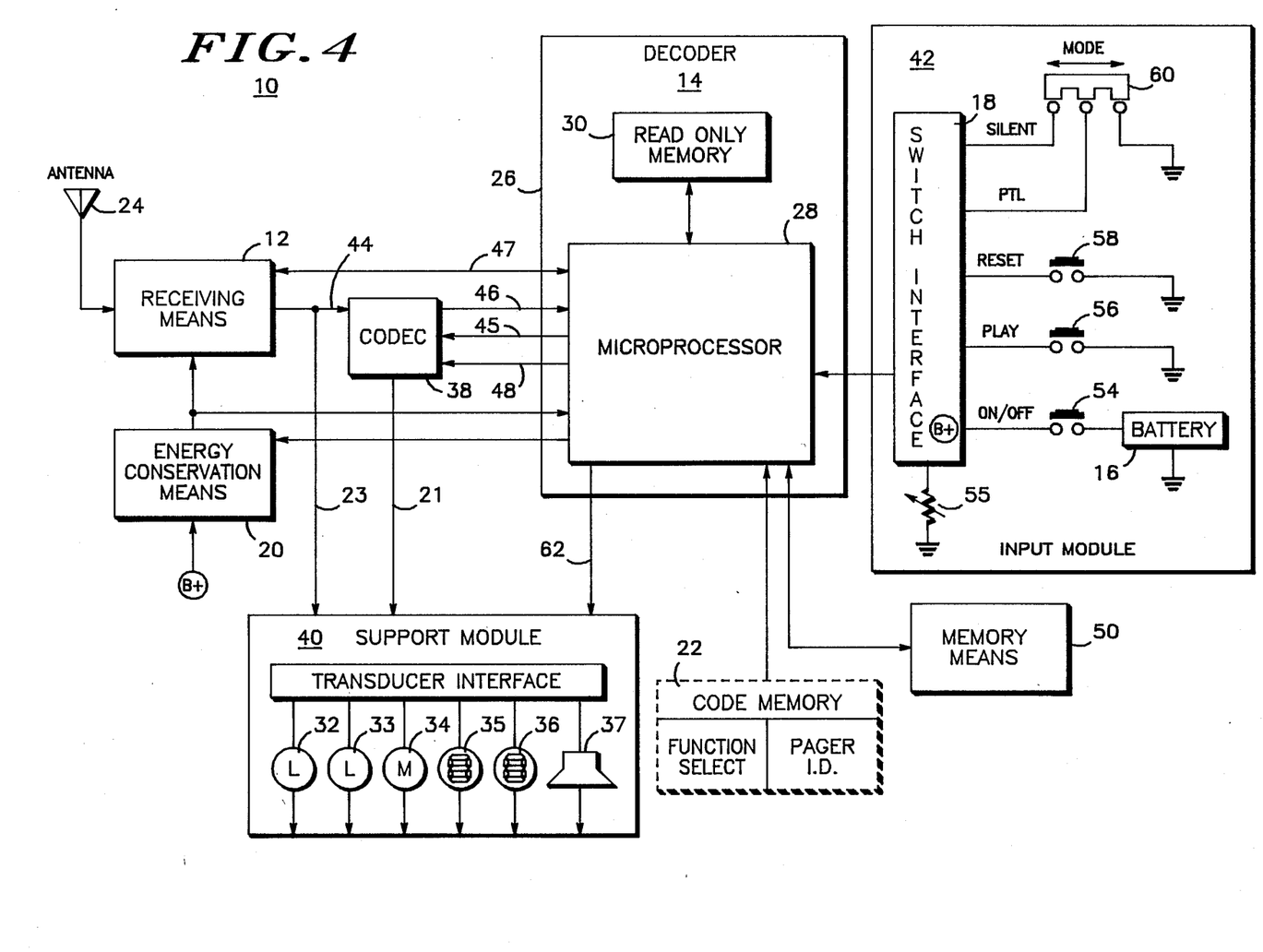
FIG. 4 illustrates a block diagram for a second embodiment of a digital stored voice paging receiver having a microcomputer decoder.

Turning now to FIG. 4, a second embodiment of the present invention illustrates a microcomputer 26 functioning as the decoder 14. Microcomputer 26 is shown to be further comprised of a microprocessor 28 and a read only memory (ROM) 30. ROM 30 includes the necessary instructions to operate microprocessor 28 to perform the functions as described below. It is understood that microcomputer 26 has the necessary timing circuitry to operate in a manner well known in the art and has similar connections as does the hardware decoder. The replacement of the hardware decoder by microcomputer 26 provides the exact same signalling decoding functions, and the resulting system functions are indistinguishable except to the paging user except as noted below.

The microcomputer 26 uses microprocessor 28 as a software decoder for processing the received signals in real time according to predetermined software routines. After the paging receiver is selectively identified, microprocessor 28 accesses the read only memory 30 for determining the correct instructions contained in that memory for processing the received signals, converting the analog voice signals to digital form, storing the digital form of the voice signal, and replaying the stored voice signals. For a better understanding of the processing, storing, and replaying of the voice signals, attention is directed to patent application Ser. No. 07/68,683 for a detailed description of the operation of the microprocessor embodiment of the paging receiver.

Figure 5A:
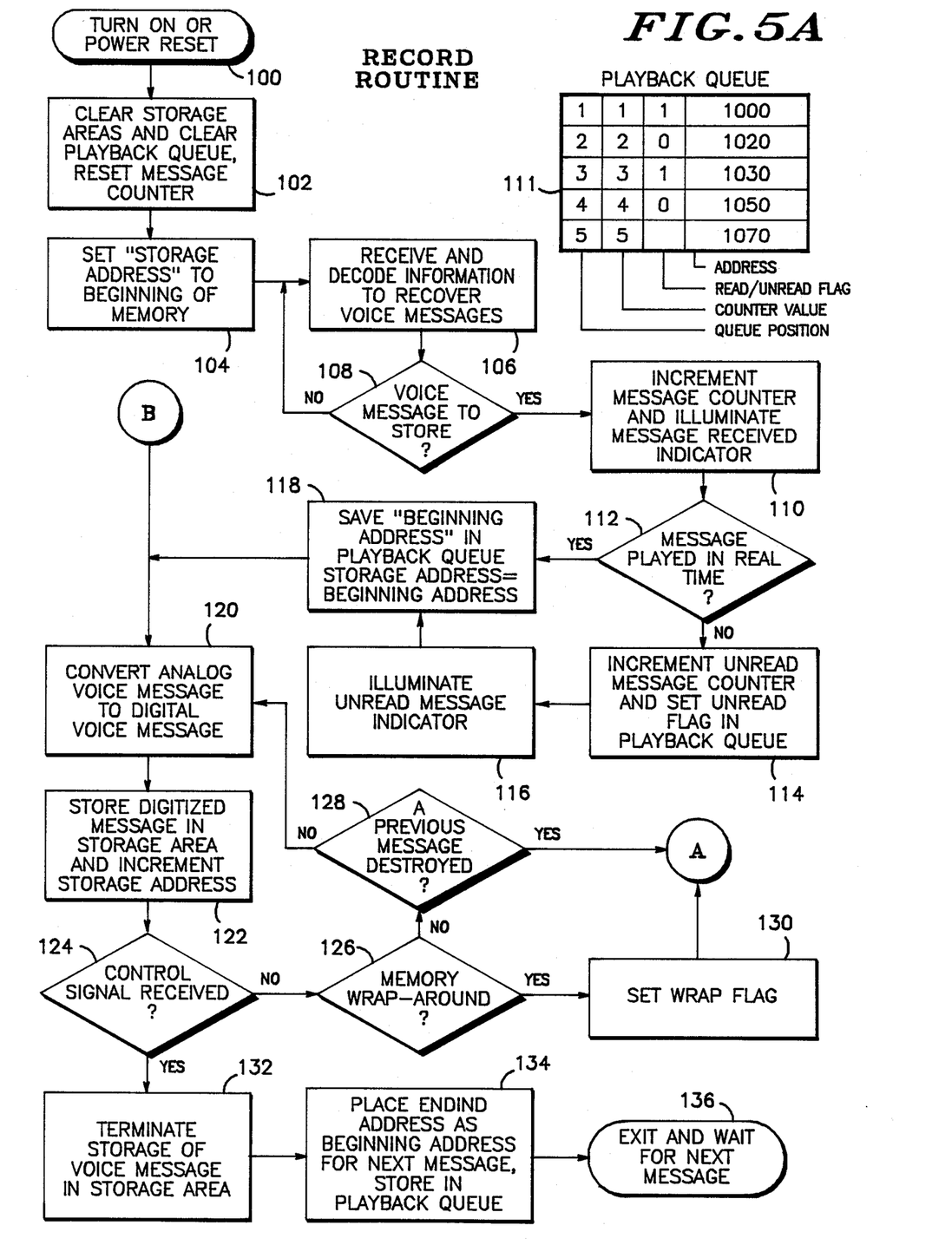
FIG. 5A is a flow chart illustrating a method for recording digitized voice messages in a variable length storage area.
Figure 5B:
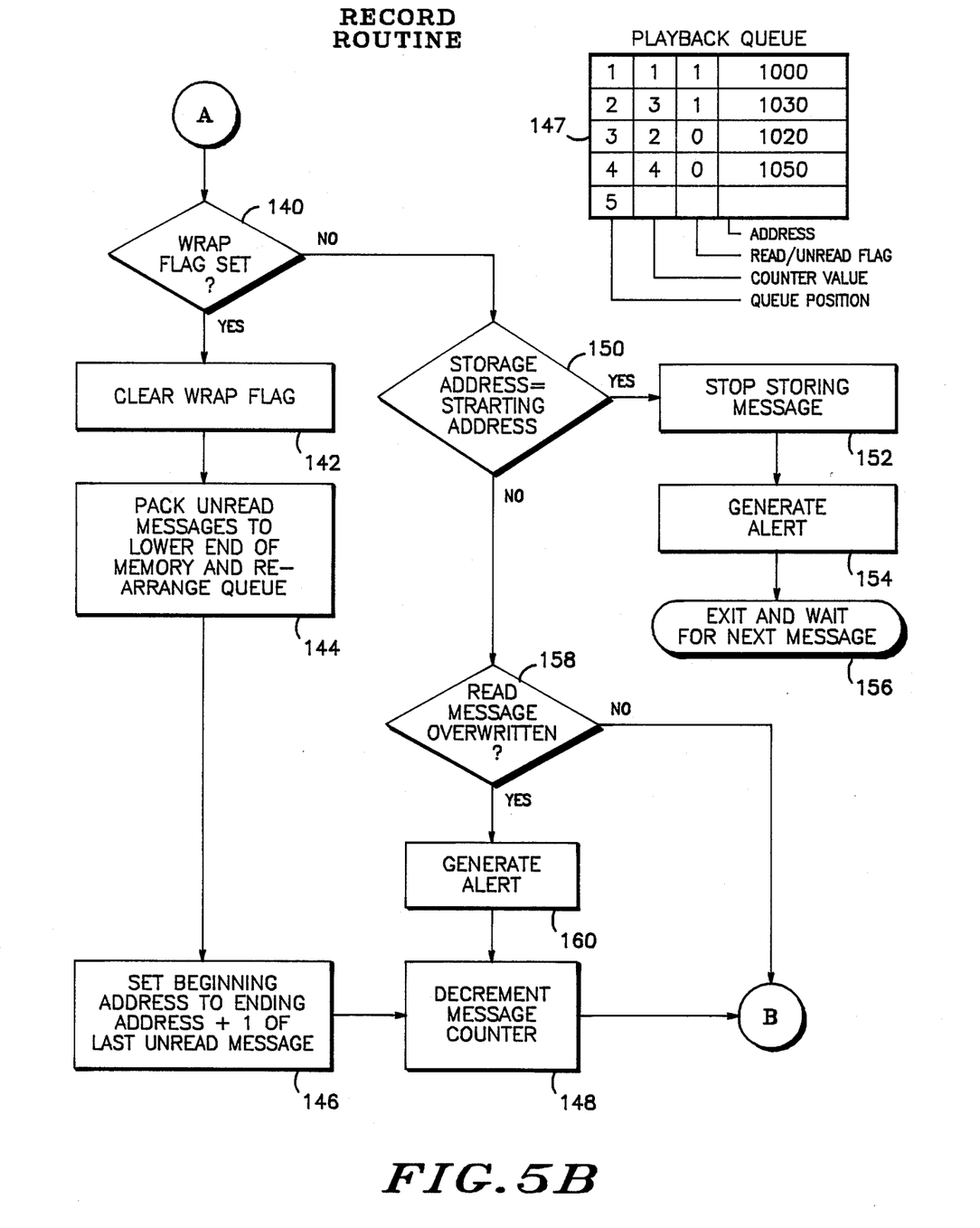
FIG. 5B is a continuation of the flow chart illustrated in FIG. 5A.
Figure 6:
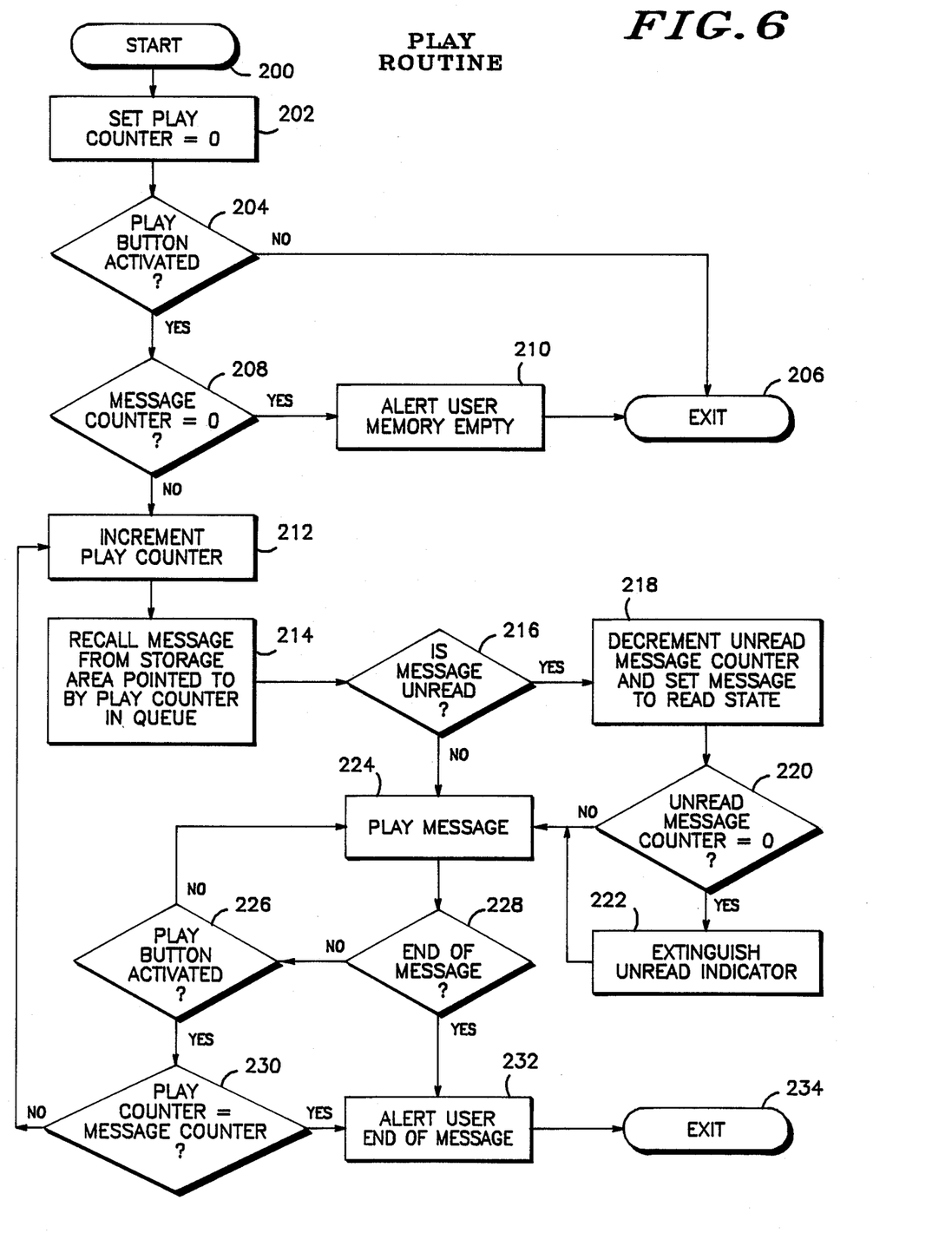
FIG. 6 is a flow chart illustrating a method for playing back digitized voice messages stored in variable length storage areas.

Referring to FIGS. 5A, 5B and 6, there are shown flow charts explain the programs or routines as stored in read only memory 30 to operate the microprocessor implementation of the paging receiver. It is understood that other routines to operate the paging receiver in the particular paging scheme are also present in read only memory 30 but are not discussed here since they are not needed for the purposes of explaining the present invention. These routines are explained with reference to U.S. patent application Ser. No. 07/68,683. In this embodiment, the microprocessor decoder stores the digitized voice messages in variable length storage areas, depending upon the length of the received voice message, thus eliminating the need for the audio producer module.

Referring to FIG. 5A, there is shown a flow chart for the receiving, processing and recording of voice information from the base station. Upon power up, the system is vectored to a power on routine, step 100. After basic housekeeping routines are completed, the method then clears all the storage areas for storing the digitized voice messages, step 102. In addition to clearing the storage areas, the message counter is reset and a playback queue (illustrated in block 111) is cleared. Briefly, the playback queue 111 stores address pointers to the storage areas in memory. Each pointer is associated with a message count. The message count essentially orders the message. The playback queue will become apparent with reference to the playback routine as illustrated in FIG. 6 and the discussion which follows. The method sets the storage address pointer for the first digital voice message received to the beginning of the first storage area, step 104. The microprocessor then goes into a wait state, waiting for information to be received by the pager, steps 106-108. Eventually, a voice message is received for storage and the microprocessor illuminates the message received indicator. Additionally, the message counter is incremented, step 110.

The paging receiver, as illustrated, may operate in different modes. Briefly, the modes are the normal mode, the push to listen mode, and the silent mode. In the normal mode, the user hears the voice message as it is received (real time) while the voice message is simultaneously stored. The push-to-listen mode requires the user to activate the reset or read (play) switch to hear the real time voice message while the voice message is simultaneously being stored. In the silent mode, the voice message is stored with no real time audio output. The modes are explained in detail with reference to U.S. patent application Ser. No. 07/68,682 and are not explained here since they are not important for the understanding of the present invention.

Referring to step 112, the method then determines if the message is to be played in real time or to be stored only in memory. If the message is not played in real time, the unread message counter is incremented, step 114. Additionally, an unread flag associated with the unread message is set in the playback queue. After the unread message counter is incremented, the unread message indicator is illuminated, step 116. It is important to note that the unread message indicator will be illuminated as long as unread messages are included in any of the storage areas. Referring back to step 112, if the message is played in real time, steps 114 and 116 are bypassed.

The beginning address for storing the message is then computed. The beginning storage address for the storing of the message is saved in the playback queue and the value of the message counter associated with the particular storage address is also saved, step 118. For example, block 111 shows an illustration of the playback queue with beginning storage address 1000 being associated with a read message 1 stored in position 1 of the playback queue, beginning storage address 1020 being associated with a read message 2 stored in position 2 of the playback queue, beginning storage address 1030 being associated with a read message 3 stored in position 3 of the playback queue, etc.

The voice message is then converted by the CODEC from an analog form to a digital form, step 120. The message is then stored, beginning at the storage address stored in the playback queue, step 122. The microprocessor-decoder then determines whether the voice message is completely received by testing the reception of a decoder control signal or carrier squelch is detected, step 124. If the message is not completely received, the method continues to convert the voice message to digital form and store the digitized signal in memory, steps 120-122.

The particular method employed uses variable length storage areas to store a digitized voice message. However, circumstances may occur where the length of the digitized stored voice is greater than the amount of memory available for storing the digitized voice information. Thus, the method checks to see if the end of memory is reached and a memory wraparound will occur, step 126. A memory wraparound is when the end of memory is reached and recording must begin again at a predetermined location in memory. This location is computed by the method illustrated in FIG. 5B. If a memory wraparound does occur, a wrap flag is set, step 130. The method then proceeds to procedure A which is illustrated in FIG. 5B. Briefly, procedure A will compute a beginning storage address for the continuation of the storage of the digitized voice message. If memory wraparound is not present, a previous memory wraparound may have occurred and a previously stored message may be destroyed. This is tested for in step 128 where it is determined whether a previous message stored in memory is going to be destroyed. This is determined by comparing the storage address of the present message to the beginning storage addresses which have been stored in the playback queue. If the storage address is equal to the beginning address of a previously stored message, the previously stored message is in danger of being destroyed. If a previous message is not going to be destroyed, then the method continues to convert the analog voice message and store it in contiguous memory, steps 120-122. However, if a previous message is going to be destroyed, then the method proceeds to procedure A which generates an alert to notify the user that a previously stored read message will be destroyed. For a thorough explanation of procedure A, reference is made to FIG. 5B.

Eventually, either by detecting carrier squelch or receiving a decoder control signal in the information, the end of the voice message is indicated and the microcomputer-decoder terminates storing of the message, step 132. The method then determines the beginning storage address for the next storage area and places this in the "beginning address" location in the playback queue, step 136. For example, in block 111, the fifth position of playback queue contains the beginning address 1070 for the next message. Thus, when a new message is received, the method will begin storing the next message at the end of the previous message, thus eliminating any unfilled memory locations. The microprocessor-decoder then returns to wait steps 106-108. In this manner, a plurality of voice messages can be received by the paging receiver and stored in memory using variable storage areas wherein the beginning address of each digitized voice message is associated with the message counter in the playback queue.

Referring now to FIG. 5B, there is shown a detailed diagram of procedure A. Briefly, procedure A is entered when a memory wraparound condition occurs or a previously stored message is to be destroyed. The procedure first begins by determining whether the wrap flag has been set, step 140. If the wrap flag is set, this signifies that a memory wraparound condition has occurred. The procedure then clears the wrap flag, step 142. The procedure then packs all unread messages to the lower end of memory and rearranges the queue such that the unread messages appear at the lower end of memory and the read messages appear at the upper end of memory, step 144. Note that the message counter value associated with each message is rearranged with the message. The storage address is then set to the ending address plus one of the last unread message, step 146. Essentially, the storage of the voice message which has caused the memory wraparound will begin storage over the oldest read voice message.

As an example, block 147 shows the playback queue of block 111 being rearranged after a memory wraparound has occurred. Since the present storing of the voice message will potentially destroy message 1, the messages are rearranged with unread messages 1 and 3 at the lower end and read messages 2 and 4 at the upper end. Storage of the present message will begin at 1020, thus destroying message 2. The message counter is then decremented, step 148. The procedure then returns to entry point B of FIG. 5A which converts the analog voice message to digital form. Referring back to step 140, if the wrap flag is not set, this implies that procedure A is being entered, not by a memory wraparound condition, but due to a previously stored message being destroyed. In this case, the storage address is checked to see if it is equal to the starting address of the present digitized voice message, step 150. If the storage address is equal to the starting address for the present message, this means that the voice message is so long that memory has wrapped around and the message is beginning to destroy itself. If this occurs, the storing of the digitized voice message is stopped, step 152. An alert is generated for notifying the user that storage has stopped because of the extreme length of the voice message being received, step 154. The procedure then exits and waits for the next message, step 156.

Referring back to step 150, if the present storage address is not equal to the starting address of the present digitized voice message, it is determined if a previously stored read message is being overwritten, step 158. This is determined by comparing the storage address to the beginning addresses stored in playback queue. If a read message is not being overwritten, the message returns to entry point B in FIG. 5A to continue converting the analog voice message to digital form. If a read message is overwritten, an alert is generated, step 160. This alert can be different than the alert of step 154 and notifies the paging user that a read message is being overwritten. The message counter is decremented since a message is being overwritten and the procedure continues at entry point B of FIG. 5A. Thus, FIG. 5B illustrates a procedure for solving the problem of storing varying length messages in a limited memory.

Referring now to FIG. 6, there is shown a detailed flow chart for the operation of the microcomputer-decoder to play back the messages stored in the variable length storage areas. The method begins by zeroing a play counter, step 202. The play counter is used by the method to recall the messages in the playback queue. Continuing with the above example, if the play counter equals 1, the message pointed at in the first queue location is recalled. If the play counter is 2, the message pointed at in the second queue location is played. After the play counter is zeroed, it is determined whether the play button has been activated by the user, step 204. If the play button has not been activated, the method exits, step 206. If the playback button is activated, it is then determined if the message counter is equal to zero, step 208. If the message counter is zero, this signifies that no messages have been stored and a memory empty alert is generated for the user, step 210. The method then exits, step 206.

Referring back to step 208, if the message counter is positive, the play counter is incremented, step 212. Initially, the play counter is zero and incrementing the play counter to 1 will play back the first message. The message pointed to by the play counter in the playback queue is then recalled from memory, step 214. For example, referring briefly to block 147 of FIG. 6, message 1 is recalled from the memory to be played. Note that the messages will be played back in the order 1-3-2-4 with the unread messages being played first. Also note that the chronological order of the read and unread messages is preserved. It is then determined if the message is unread by a flag which has been set in the playback queue associated with the playback pointer, step 216. If the message is unread, the unread message counter is decremented and the message is set to read, step 218. If the unread message counter equals zero, this signifies that no remaining unread messages remain and the unread message indicator is extinguished, steps 220-222. After the unread message determinations have been made, the message is converted from digital form to analog form by the CODEC and played on the audio transducer of the support module, step 224. The play button is then sensed to determine if it has been activated, step 226. If the play button is activated while the message is playing, this signifies that the user desires to play the next message. In this case, the method then determines if the play counter now equals the message counter, step 230. If the play counter equals the message counter, this signifies that all the messages have been played and an alert is generated, step 232, and the method exits, step 234.

Referring to step 230, if the playback counter is not equal to the message counter, this signifies that more messages remain in the storage areas to be played back and the method proceeds back to step 208. Referring back to step 212, if the playback button is not activated during the playing of the message, eventually the end of the message is reached, step 228. This is done by comparing the playing address to the beginning address of the next message that is stored in the playback queue. When the end-of-message is reached, the user is alerted and the procedure exits, steps 232-234. It is important to note that if the play button is not activated during the playing back of a message, only that message is played back. To play additional messages, the user must activate the play button for each message. For example, to play the second message, the user would activate the play button twice. When the playback procedure is started again by the user, playing of the messages begins with the first message stored in memory.

Turning now to a discussion of the paging format, while it is clear that many types of formats and signal coding may be utilized for the present invention, the preferred uses a modified Golay sequential code paging system. The Golay sequential code (GSC) is a selective call paging protocol based largely on the current. GSC binary paging format. A full description of the Golay code may be found in a paper entitled "Selective Signalling for Portable Applications" by Leonard E. Nelson, 28 IEEE Vehicular Technology Conference, Denver, Colo., Mar. 21–24, 1978. The Golay sequential code is an NRZ binary signalling format has been greatly modified from the earlier format to accommodate intermixed tones only, tone and data, as well as tone and voice paging. The GSC is an asynchronous paging format which allows pages to be transmitted. Maximum messages to tone only and tone and data pages is achieved in the batch transmission mode while the individual call mode for tone and voice paging.

Figure 7:
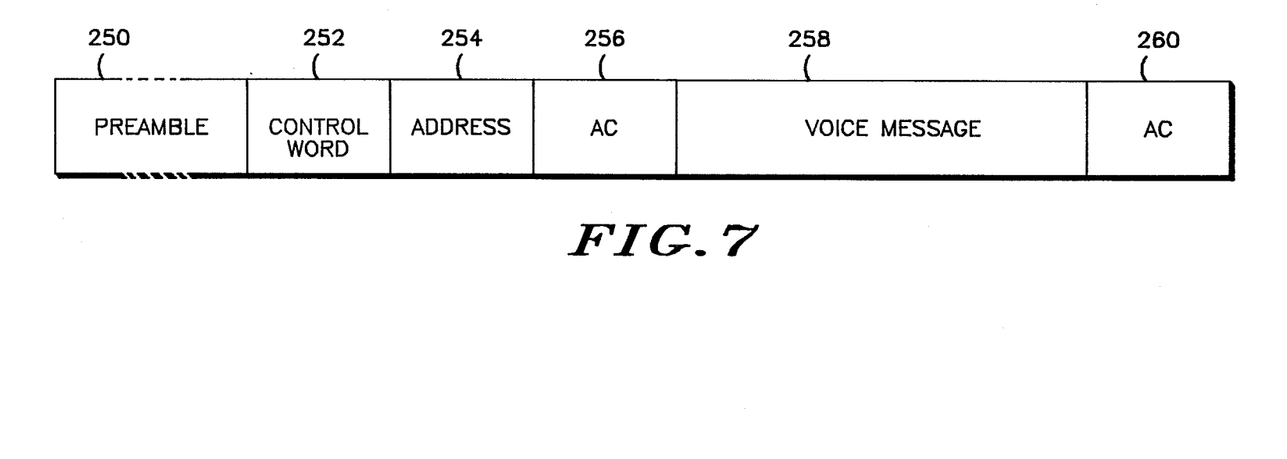
FIG. 7 illustrates a paging system format eliminating the alert time gap.

FIG. 7 shows a timing diagram for a modified GSC message signalling system for voice messages. The single call address format includes a preamble 250, control word 252, and address code 254, and for voice paging, an activation code 256. The preamble serves to divide pagers within the system into groups for improved battery life as well as to uniquely identify GSC transmission from other coding schemes to facilitate channel sharing without sacrificing battery life or false call integrity. The control word 252 limits the end of the preamble and supplies timing information for the batch mode decoding. The address uniquely identifies each pager and the activation code 256 is used to control the pager audio circuits in voice paging to notify the pager of the presence of a voice message 258. The batch mode of operation allows a string of addresses to be transmitted following a control word.

The address 254 is followed by the activation code 256 and upon the reception and detection of the activation code, the paging receiver, depending upon its mode, commences storing the message or generates an alert to warn the paging user of the presence and storing of a subsequent voice message 258. It is important to note that the alert can occur after the storage of the voice message. At the conclusion of the variable length voice message 258, the inclusion of a deactivation and control word 260 which, for the preferred embodiment, is the second detected occurrence of the activation code word results in the activation signal being applied to the audio producer module in the hardware embodiment or the termination of storing the voice message in the microprocessor embodiment.

In addition, the deactivation code can be eliminated and the decoder can determine the termination of the voice message by the activation generated by the receiving means via the carrier squelch technique as described before. Thus, there has been shown a format which significantly increases the throughput for voice messages by eliminating the time gap previously used by prior art paging receivers to alert the user.

Thus, there has been shown in the present invention an efficient and useful paging receiver for receiving, digitizing, storing, and playing back of voice messages for a user. In a first embodiment of the present invention, messages are stored in allocated fixed length storage areas with the inclusion of predetermined analog signals when the voice message is less than the capacity of the allocated fixed length storage area. In a second embodiment of the present invention, a microprocessor-decoder stores a plurality of voice messages in variable length storage areas. Finally, a paging format has been shown which significantly increases throughput by eliminating the time gap previously used to generate an alert for the paging user before the receipt of a voice message.

It should be apparent from the above description that numerous variations can be made from the preferred embodiment as described herein without departing from the scope of the invention. Reference is therefore made to the claims which follow for a definition of the invention.

What is claimed is:

1. A paging receiver comprising:
   receiving means for receiving selective call signals intended for said paging receiver, wherein the selective call signals include at least one analog voice message for said paging receiver;
   decoding means responsive to said selective call signals for enabling said paging receiver to recover said analog voice message;
   conversion means responsive to said receiving means and said decoding means for converting said analog voice message to digital signals representative of a replica of the analog voice message;
   memory means including at least one fixed capacity storage area for storing digital signals;
   means for sensing the end of the recovered analog voice message and generating an end of message signal in response thereto;
   signal producing means for generating predetermined digital signals;
   control means for accessing said memory means to store in a portion of a selected fixed capacity storage area thereof the converted digital signals of said analog voice message during the conversion thereof by said conversion means and, governed by said end of message signal, to access said memory means to store in the remaining portion of said selected fixed capacity storage area the predetermined digital signals during the generation thereof; and
   means for inhibiting memory accessing by said control means when the remaining portion of said selected fixed capacity area is filled.

2. The paging receiver of claim 1, wherein the generated predetermined digital signals represent an audio signal comprising a tone.

3. The paging receiver of claim 1, wherein the generated predetermined digital signals represent an audio signal comprising a plurality of tones.

4. The paging receiver of claim 1, wherein the generated predetermined digital signals represent an audio signal comprising a music melody.

5. The paging receiver of claim 1, further comprising:
   means for counting the number of messages received; and
   means for displaying an indication of the count from said counting means.

6. The paging receiver of claim 1, wherein said signal producing means generates a predetermined bit pattern to fill the remaining capacity of the selected storage area when the storage of the digital voice message is less than the storage capacity of its selected storage capacity area.

7. The paging receiver of claim 1, further comprising:
   means for generating an alert while simutaneously receiving the analog voice message.

* * * * *